April 29, 1958 B. E. LOGIE 2,832,220
TRI-SCALE ALTIMETER
Filed Aug. 16, 1955 2 Sheets-Sheet 1
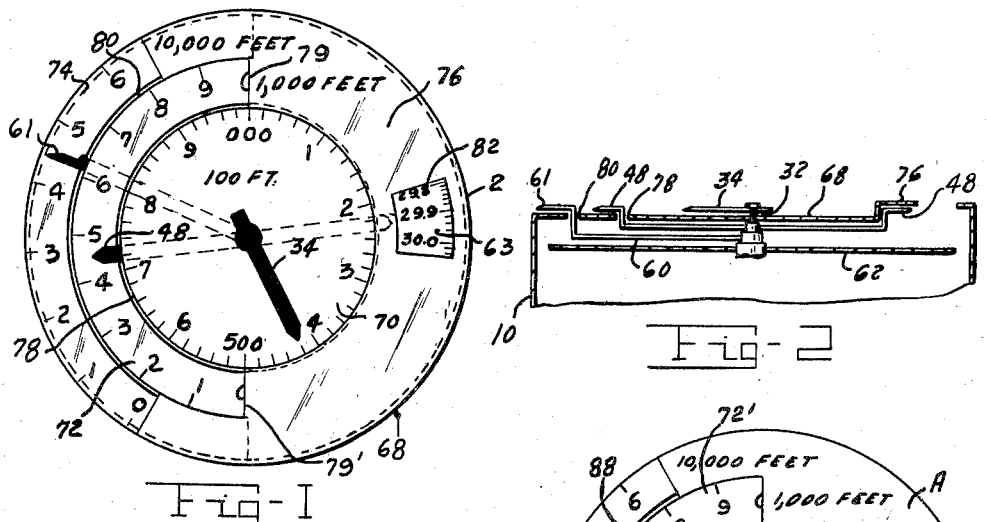
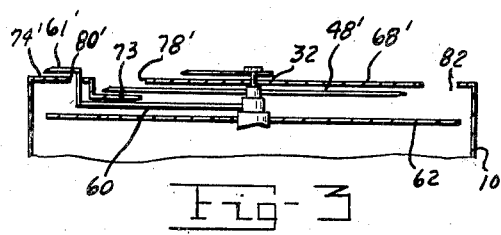
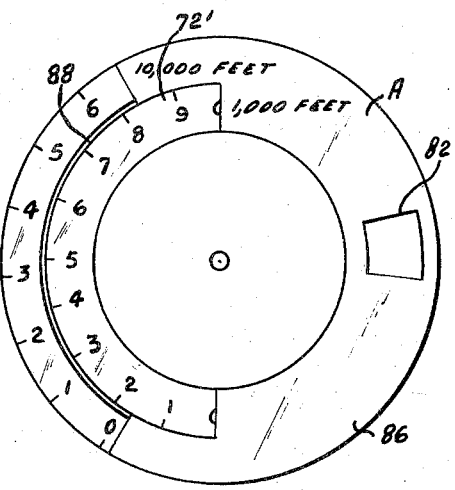
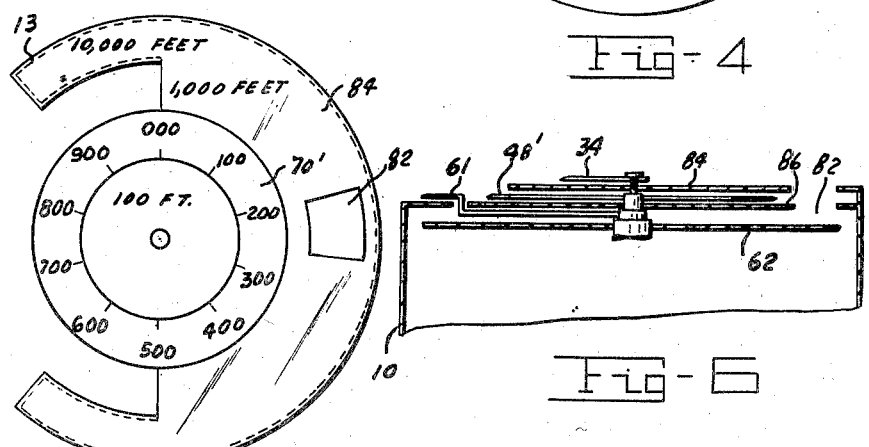
INVENTOR.
BYRON E. LOGIE
ATTORNEYS April 29, 1958

B. E. LOGIE 2,832,220

TRI-SCALE ALTIMETER

Filed Aug. 16, 1955

INVENTOR.
BYRON E LOGIE

BY
ATTORNEYS

United States Patent Office 2,832,220
Patented Apr. 29, 1958

2,832,220
TRI-SCALE ALTIMETER
Byron E. Logie, Hampden, N. Dak.

Application August 16, 1955, Serial No. 528,854

6 Claims. (Cl. 73—387)

(Granted under Title 35, U. S. Code (1952), sec. 266)

The invention described herein may be manufactured and used by or for the United States Government for governmental purposes without payment to me of any royalty thereon.

This invention relates to a measuring instrument and more particularly to an altimeter provided with three separate scales and three separate distinguishable needles or pointers.

In modern high speed aircraft the pilot must have instruments that are accurate and easy to interpret. The present altitude instrument requires time consuming concentration for accurate reading. It has one dial and three needles spanning the face of the dial for registering 100, 1,000 and 10,000 feet, respectively. Numerous opportunities for error occur. The readings for the shorter needles have to be estimated and the gap between the needle point and the figure at the outer periphery of the dial has to be guessed at. The 1,000 foot needle in a position closely below a figure is easily read at that figure instead of the correct figure which is the one preceding it.

Another common error which occurs in the reading of the pointers is incorrect sequence. In the standard altimeter the long needle registers 100 feet and the shortest one registers 10,000 feet. The tendency is a natural one to read the pointers in clockwise direction without reference to their length.

The results of a great deal of experimentation have shown that dials are read most accurately when the indicating pointers are in the nine o'clock position.

Furthermore there are positions where the needles cover one another or lie so closely together that their readings are not easily distinguishable.

The object of the present invention is to provide an altimeter, an airspeed indicator or other pressure responsive instruments which the operator can read easily and without undue concentration and where the errors above noted are greatly lessened and many of them eliminated altogether.

A further object of the invention is the provision of an altimeter or other pressure responsive instrument which has two or more separate calibrated scales and a needle or pointer which spans or traverses each dial and extends to the calibration markings on it.

A further object of the invention is the provision of an altimeter face wherein the calibrated scales and indicating pointers are so arranged that readings are always made from left to right which is the normal reading pattern and in consequence the probability of reading them in incorrect order is very greatly lessened.

A further object of the invention is the provision of an altimeter upon which an approximate altitude can be read at a glance and independently of the smaller unit readings.

A further object of the invention is to provide an instrument in which the pointers on the outer scale move upward as the measurement increases and downward as the measurement decreases. In an altimeter, when the plane goes up, i. e., when its altitude increases, the pointers indicating all but the smallest unit go up too, and when the altitude decreases, the needles travel downward.

A further object of the invention is the provision of a pressure measuring instrument wherein all of the readings are made on the left half of the dial in the vicinity of the nine o'clock position.

Other objects and advantages will become apparent from the following description and accompanying drawings in which like reference characters refer to like parts in its several figures.

Figure 1 is a front face view of one form of the altimeter embodying a dial face comprising a single disc;

Figure 2 is a cross sectional view of Figure 1;

Figure 3 is a modification showing a second form of the invention also embodying a single disc face;

Figures 4 and 5 are a modification showing a third form of the invention embodying a face comprising two discs;

Figure 6 is a cross sectional view of this last mentioned modification;

Figure 7:
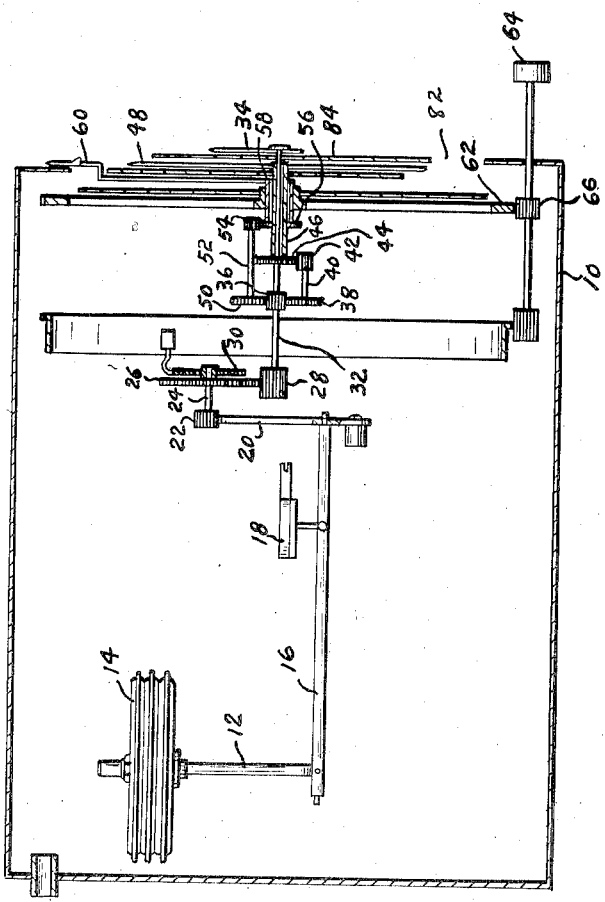
Figure 7 is a longitudinal sectional schematic view of a complete altimeter showing the gears, the dials and the needles or pointers.

Referring more in detail to the drawings the numeral 10 refers to an altimeter container, or casing.

The invention resides in the arrangement of the needles and face. The other elements of the altimeter are conventional and can be found with the exception of one or two gear ratio changes in any standard sensitive altimeter.

A pivoted crank arm 12 is connected at one end to the bellows 14 and at the other to a rocking arm 16. A conventional balance device 18 is pivoted to the arm 16 and provides the necessary balance for maintaining the system in equilibrium. Rigidly connected to the arm 16 and rocking with it is a rocking arm 20 provided with gear teeth which engage the teeth of a gear 22. The gear 22 is mounted on the arm 24 which carries a gear wheel 26. The gear wheel 26 meshes or engages a gear 28. A spring device 30 is provided to keep parts in taut engagement. The gear 28 is mounted on a central shaft 32. This central shaft carries a needle 34 which registers on a 100 foot dial scale later described. A gear 36 mounted on a shaft 32 for rotation therewith meshes with a gear 38 carried on an arm 40 which operates through a pair of gears 42 and 44. The gear 44 is carried on a sleeve 46. The sleeve 46 carries and operates a needle or pointer 48 which travels over a 1000 foot scale or dial later described. The gear ratio of the gears operating the pointer 48 is one-half that of the standard clock type altimeter, since the dial which the pointer 48 spans extends through 180 degrees or half a circle instead of the usual full circle. A second gear 50 meshes with the gear 36 and is carried by an arm 52. The arm 52 carries a gear 54 which meshes with a gear 56. The gear 56 is carried on a sleeve 58. The sleeve 58 carries and operates a needle or pointer 60 which travels over the 10,000 foot scale or dial later described. The end 61 of the pointer 60 may be a shape coded needle, such as the outline of an airplane as shown in Fig. 1, or other conventional design.

A plate 62 carrying barometer readings shown at 63 is common to all modifications. It is rotatable and adjustable by means of the finger screw 64 and the gear 66 to be set at a desired figure. This figure visible through a window is usually set at barometric sea level pressure, or the pressure the aneroid 14 would maintain at sea level. In adjusting the pressure to be maintained within the aneroid a balance or equilibrium is assumed to be established between the interior and exterior pressure at sea level. Then the subsequent changes indicated by pointer readings indicate changes in the exterior pressure. These changes are registered on the calibrated dials in terms of altitude in feet. The foregoing is conventional in the standard altimeter Applicant has provided a separate calibrated scale or dial, upon which each needle or pointer has its own reading. The barometer plate is shown at 62. The 100 foot needle, the 1,000 foot needle and the 10,000 foot needle are shown respectively at 34, 48 and 60. A single disc face 68 is used in modification shown in Figures 1 and 2. The disc 68 is provided with a plurality of calibrated scales or dials. The 100 foot scale 70 is radially nearest the center and comprises a complete circle registering from 0 to 1000 feet. The 1,000 foot dial 72 is placed next radially outward. It comprises a half circumference or 180 degrees, and has calibrations from 100 to 10,000. Its location is at the left of the scale 70.

The 10,000 foot dial 74 has calibrations, reading from 0 to 70,000 feet or more, as is desired and is positioned at the left peripheral portion of the disc 68.

The 100 foot needle 34 is connected to the shaft 32 as before described and makes complete revolutions of the dial as the shaft 32 rotates. The needle 48, as shown in Figure 2, is pivoted at its mid point on the sleeve 46 and is provided with an indicating pointer at each of its ends. As shown in Figures 1 and 2, the outer circumferential area of the right half of the face 68, i. e., the portion spaced radially outwardly from the scale 70 is pressed upward and lies in a plane slightly spaced from the remaining surface. This device provides a shield portion 76, constituting a cover or shield which masks the needle throughout the right hand half or 180° of its travel. The pointers on the ends of the needle 48, as shown in Figure 2, are offset upwardly. As the indicator 48 rotates it extends through a slot 78 in the face 68 and spans the calibrated scale 72. When it reaches the 10,000 foot mark in ascent or the 100 foot mark in descent, it passes through a slit 79 or 79' and under the shield 76. Throughout the right half of its travel it is shielded, and the opposite end is registering on the scale 72. In this manner the indicating portion of the dial lies completely at the left while each indicating pointer travels a full circle.

The needle 60, as shown in Figure 2, also travels completely at the left. It is provided with an offset end portion 61 which extends through a slot 80 and spans the calibrated scale 74.

In the modification shown in Figure 3, the dial plate or face is comprised of a single plate 68' which carries all of the dials. The 10,000 foot dial 74' has a slot 80' at its inner periphery through which the offset pointer 61' of the needle 60 extends. The dial 73 is depressed from the surface of the plate 68' and has a slot 78' along its inner periphery through which the double ended straight needle 48' extends. The right side of the plate 68' covers the needle 48' throughout the right hand 180° of its travel.

In all modifications the face plate or plates are provided with indicating window slots 82 and the desired barometer reading is placed beneath and readable through it.

In the modification shown in Figures 4, 5 and 6 the face of the altimeter is comprised of a pair of dial plates 84 and 86 instead of the single dial 68. The top plate 84 carries the center 100 foot dial 70' and the window 82 through which the barometer reading is made available. The plate 86 is secured to the casing 10 below the plate 84, carries the 1,000 foot dial and the 10,000 foot dial and a slot 88 through which the 10,000 foot needle 60' extends. In this arrangement the thousand foot needle 48' with the indicator on each of its ends is straight.

It should be noted that since the needle 48 is a double ended pointer, in which only one end at a time registers with the 1,000 foot scale this needle is geared to turn at one half the normal speed of the conventional 1,000 foot needle on the conventional sensitive altimeter.

It will be seen that in each of the embodiments of the invention, all of the dials except the smallest unit are placed at the left, and are not over 180° in span, all readings are thus made from left to right, i. e., in the near vicinity of the nine o'clock position.

It should also be noted that each needle except the 100 foot needle is masked throughout all of its length except its indicating tip, and the scales are radially spaced. By this arrangement, no indicator is obscured by any other indicator, regardless of the position in which the needles fall.

It will be understood that the invention is not limited to the specific disclosures but may be modified within the scope of the claims.

I claim:

1. In a measuring instrument such as an altimeter, a face having three separate calibrated scales thereon radially spaced from each other, a pointer for each scale operated from a central pivot point, said calibrated scales and pointers being arranged to be read, in most of their positions, from left to right, said three calibrated scales comprising a 100 foot scale positioned most inward radially and comprising a 360° calibrated face, a 1,000 foot scale comprising a 180° calibrated face located to the left and radially outwardly from said 100 foot scale, a 10,000 foot calibrated scale of less than 180° and positioned at the left and radially outwardly from the other two scales, the pointer traversing each of said last two mentioned scales being masked throughout most of their length.

2. In a sensitive measuring instrument, a face comprising a disc, said disc being provided on its outer left periphery with a calibrated scale of no more than 180° in extent, a second calibrated scale of 180° extent located radially inwardly from said first named calibrated scale and positioned on a depressed half circular section located on the left portion of said disc and bounded at its outer periphery with an arcuate slot, a calibrated scale forming a completed circle located radially inwardly from and concentric with said previously mentioned scales indicating needles spanning each of said calibrated scales and readable in order from left to right, the indicating needle spanning the 180° scale being pivoted at its mid point, an indicating pointer on each of its ends, the right hand portion of said face which is complementary to said depressed portion forming a shield, a radial slot at each end of said depressed portion, each end of said last named needle traversing said 180° dial alternately and alternately passing underneath said shield through end slots in the depressed portion.

3. In an altimeter, a face, a plurality of calibrated altitude indicating scales radially positioned on said face, and being contained completely within the left half of said face, indicating pointers traversing each of said scales, means for operating said pointers in response to changes in altitude, said scales and pointers being so placed that said pointers are always traveling in an up direction when the altitude increases, and always travel in a down direction when the altitude decreases.

4. In a sensitive pressure measuring instrument having a circular face, a plurality of concentric radially spaced calibrated dials, disposed on the left half of said face, a separate concentrically pivoted needle provided with a pointer disposed to span each calibrated dial, said calibrated dials being calibrated in units descending in magnitude from left to right so that the dials are read from left to right.

5. In a sensitive pressure measuring instrument having a circular face, a plurality of concentric radially spaced calibrated dials, disposed on the left half of said face, a separate concentrically pivoted needle provided with a pointer disposed to span each calibrated dial, said calibrated dials being calibrated in pressure measuring units descending in magnitude from left to right, shields for masking all but the pointing portion of some of said needles so that no needle is ever obscured by any other needle regardless of its position, and substantially all readings are made from left to right.

6. In a sensitive pressure measuring instrument, a first disc and a second disc concentrically mounted in slightly spaced parallel planes, said first disc being positioned above said second disc and provided with a circumferential cut-out portion and a calibrated 360° dial positioned radially inwardly from said arcuate cut-out portion, said second disc being provided with a pair of radially spaced calibrated dials, both dials coinciding with and visible through the circumferential cut-out portions on said first disc, one dial being circumferentially positioned and being less than 180°, the other being 180°, said second disc being provided with an arcuate slot defining the division between the dials on said disc, three needles concentrically mounted, one for transversing each of said dials as follows: a first needle travelling a 360° path for transversing the 360° dial on said first disc, a second needle pivotally mounted midway of its ends beneath said first disc for providing an indicating portion at each end, said needle transversing the 180° dial on said second disc, one end of said needle being masked by a portion of said first disc while the other end transverses said 180° dial, a third needle mounted below said second disc, said third needle being provided with a vertical portion extending through said arcuate slot in said second disc and having a horizontal portion transversing the circumferential dial on said second disc.

References Cited in the file of this patent
UNITED STATES PATENTS

| | | |
|---|---|---|
| 1,352,719 | Baldwin | Sept. 14, 1920 |
| 2,112,704 | Mackay | Mar. 29, 1938 |
| 2,123,395 | Antrim | July 12, 1938 |
| 2,260,541 | Schwenn | Oct. 28, 1941 |
| 2,689,480 | Angst | Sept. 21, 1954 |

FOREIGN PATENTS

| | | |
|---|---|---|
| 446,795 | France | Oct. 11, 1912 |
| 304,692 | Great Britain | Nov. 7, 1929 |